Figure 1:
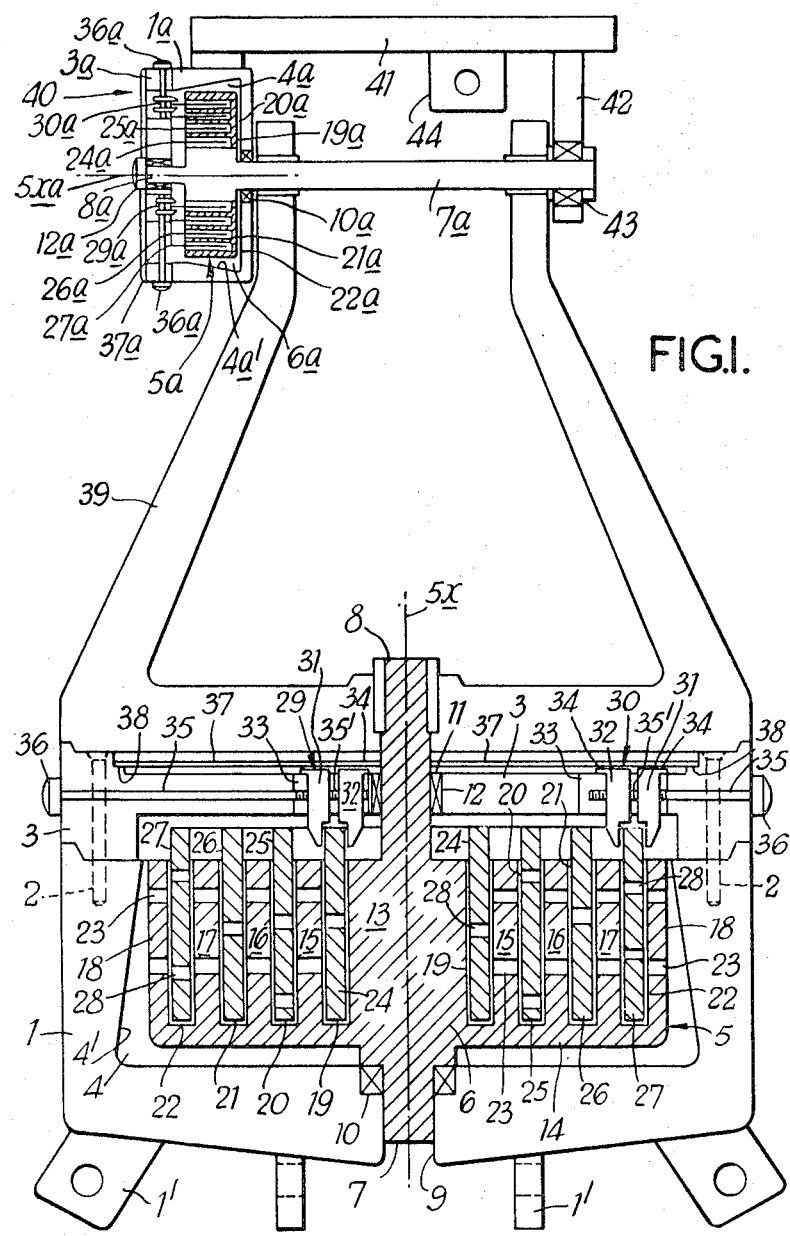

United States Patent

[11] 3,552,699

| [72] | Inventor | Harry J. Baker |
| | | Greenford, Middlesex, England |
| [21] | Appl. No. | 840,767 |
| [22] | Filed | July 10, 1969 |
| [45] | Patented | Jan. 5, 1971 |
| [73] | Assignee | Ronford Limited |
| | | Bisley, Surrey, England |
| | | a British company |
| [32] | Priority | July 22, 1968 |
| [33] | | Great Britain |
| [31] | | No. 34849/68 |

[54] MOUNTING HEADS FOR CAMERAS OR LIKE DEVICES
26 Claims, 3 Drawing Figs.

[52] U.S. Cl. .................................................. 248/183,
188/90, 192/58
[51] Int. Cl. .................................................. F16m 11/12
[50] Field of Search ............................................ 248/178,
183, 186; 192/58-A2; 188/90-A5; 74/(Inquired)

[56] References Cited
UNITED STATES PATENTS

| 1,238,447 | 8/1917 | Severy | 188/90-A5 |
| 2,272,566 | 2/1942 | Laube et al. | 248/186 |
| 2,727,594 | 12/1955 | Ganster | 188/90-A5 |
| 2,905,421 | 9/1959 | O'Connor | 248/183 |
| 2,955,472 | 10/1960 | Krupick et al. | 248/183 |
| 3,091,309 | 5/1963 | Sheldon | 188/90-A5 |
| 3,167,966 | 2/1965 | Ashleman | 188/90-A5 |
| 3,295,639 | 1/1967 | Smith | 188/90-A5 |
| 3,353,776 | 11/1967 | Clemens | 248/183 |
| 3,424,406 | 1/1969 | Rumsey et al. | 188/90-A5 |

FOREIGN PATENTS

| 1,167,545 | 4/1964 | Germany | 248/177 |

*Primary Examiner*—Marion Parsons, Jr.
*Attorney*—Stevens, Davis, Miller & Mosher ABSTRACT: The disclosure of this specification relates to a mounting head (particularly for cameras) comprising a rotor assembly rotatably mounted in a body part of which the body can be coupled to a stand and a rotor of the rotor assembly can be coupled to a camera. The rotor assembly includes at least two ring members located in separate chambers in the rotor, containing viscous fluid to be capable of rotary movement relative to the rotor through both the chambers and the viscous fluid. Ring-engaging means is provided by which one or more of the ring members can be secured relative to the body so that the degree of feel during relative rotation between the rotor and body can be selectively adjusted by varying the ring members which are held stationary relative to the body part.

MOUNTING HEADS FOR CAMERAS OR LIKE DEVICES

This invention relates to mounting heads for cameras or like devices as, for example, spotlight, floodlights, telescopes and theodolites, which are to be mounted to exhibit scanning, panning or tilting movement by rotation about a given axis.

The present invention is directed towards the provision of an improved mounting head and, although it can be utilized for mounting one of the devices given above by way of example, it is particularly advantageous when used for the mounting of a cinematograph or television camera and this specification will, as a matter of convenience, hereinafter refer to such application. It is to be realized however, that any minor modifications which may be necessary to apply the head of the present invention for the mounting of a device other than a cine or television camera are merely a matter of design and will be apparent to persons skilled in the relevant art.

It is nearly always desirable to mount a television or cine camera on a mounting head carried by a suitable support (for example, a dolly, tripod or the like) so that the camera can be swiveled or pivoted relative to the support to provide a panning, tilting or scanning motion in one plane or in two mutually perpendicular planes. It has hitherto been proposed to provide a mounting head in which the "feel" (that is the resistance to manual swiveling movement) of the camera during panning or the like is adjustable. In one form of construction of a mounting head, adjustment of such feel has been obtained by manually increasing or decreasing the degree of friction developed between two relatively adjustable and cooperating members carried in the mounting head, one of the members being adapted to move with the camera during panning and the other member being fixed relative to the support. Adjustment of feel by frictional engagement in the aforementioned manner has the inherent disadvantage that it is generally not possible to initially move the camera from a stationary position without imparting shake or a jerk to the camera with the result that the picture taken (particularly with a cine camera) has a shake the degree of which usually increases as the amount of feel is increased. A further construction of a hitherto proposed mounting head has incorporated adjustable feel by utilizing a complex system of gearing. The incorporation of a gearing system in a mounting head makes it extremely costly to manufacture and, like the "friction head" devices, has the disadvantage that considerable wear takes place between the relatively moving and engaging parts which results in backlash or inconsistent adjustments for the mounting head. Consequently both friction and gear-operated mounting heads require frequent servicing.

It is an object of the present invention to provide a mounting head for a camera or like device which head is intended to be secured relative to a support so that a swiveling action can be imparted to a camera on the mounting head and the degree of feel to such swiveling movement can be selectively adjusted whilst the inherent disadvantages of hitherto proposed mounting heads which incorporate adjustable feel are substantially avoided.

BRIEF SUMMARY OF THE INVENTION

According to the present invention there is provided mounting head for a camera or like device and which includes a rotor assembly mounted to be capable of axial rotation relative to a body part adapted to be coupled to a first member, the rotor assembly comprising a rotor adapted to be coupled to a second member which is intended to be axially rotated relative to the first member and having at least two chambers containing a viscous liquid medium and ring members located one in each of the chambers to be coaxial with the axis of rotation and capable of axial rotation therein relative to the rotor through the viscous liquid medium; and ring-engaging means associated with the ring members whereby the ring members can be selectively engaged and held stationary relative to the body part so that the degree of feel during relative rotation between the rotor and the body part can be selectively adjusted by adjustment of the ring-engaging means to vary the ring members which are held stationary relative to the body part.

By the mounting head of the present invention the body part and rotor can be respectively coupled to a support and a camera (or like device) or vice versa so that the camera can be axially rotated relative to the support and, with one or more ring members held stationary relative to the housing by the ring engaging means, feel is imparted to movement of the camera during relative rotation between the rotor and the housing by the shear forces developed in the viscous liquid as a result of relative movement between the rotor and the ring member or members. The degree of feel is selectively increased or decreased by adjusting the ring engaging means to change the number of ring members which are, or size of ring member which is, held stationary relative to the housing.

Conveniently the coaxial ring members are located axially, at least part; one within the other and similarly the chambers may be coaxial and located axially, at least part, one within the other. Preferably the chambers and ring members are annular. The annular chambers may be of cylindrical shape and formed between adjacent and opposed cylindrical surfaces of an array of axially extending and radially spaced annular flanges of the rotor and the ring members of cylindrical form to be a sliding and push fit in their respective annular chambers.

The rotor assembly is preferably mounted in an enclosed housing of the body part and although it is possible for the viscous liquid medium to be solely in the chambers, it may be displaced from these chambers during use of the mounting head into the housing. For this reason the housing can be partially or fully filled with the viscous liquid medium to ensure that the fluid is maintained in the annular chambers. The rotor can be in the form of a cage to permit the passage of the viscous liquid from the housing and between the chambers or, alternatively, the walls of the rotor which define the chambers can be provided with apertures through which fluid can pass between the chambers and also from the effective viscous liquid reservoir provided by the housing. Further, each of the ring members can be provided with a plurality of apertures to permit the flow of viscous liquid substantially radially therethrough between their inner and outer peripheral surfaces so that viscous liquid can effectively pass throughout the whole rotor assembly.

It has been found in certain instances when using very viscous liquid medium that liquid displaced from the chambers into the housing does not readily flow back to the chambers irrespective of holes being provided in the rotor and ring members and a reservoir of viscous liquid being provided in the housing. To minimize this difficulty the rotor and body part may be shaped in the housing to provide a pumping effect on the viscous liquid medium to circulate it through the housing and into the chambers during their relative rotation. Efficient flow of the viscous liquid has been successfully achieved by constructing the rotor and body part so that an outer and axially extending sidewall of the rotor and adjacent inner and axially overlying sidewall of the body part which partly defines the housing converge towards each other. By this construction it is believed that the rotor and housing effectively constitute a pump for the viscous liquid during relative rotation between the rotor and the housing and viscous liquid in the space formed between the convergent sidewalls is subjected to shear forces and variations in pressure which cause it to flow through the holes in the rotor and ring members to the chambers. To provide such a "pumping" action the rotor is conveniently made with its outer surface of cylindrical form and coaxial with its axis of rotation and the body part is machined to provide an internal and coaxial frustoconical surface. When the rotor is mounted in the housing the rotor and the inner frustoconical surface of the body part are coaxial and one end of the cylindrical outer surface of the rotor is closely situated to the frustoconical surface of the housing so that the frustoconical inner surface of the housing axially overlies the cylindrical outer surface of the rotor and diverges away from the said one end of the rotor.

The ring-engaging means is conveniently incorporated in the structure of the body part and can take several forms. In one form of construction a plurality of clamping devices are provided which are associated one with each of the ring members and are carried by the body part so that each device can be controlled, conveniently by rotation of a screw-threaded bolt, to clamp one or more of the ring members to the body part. In a further, and preferred, form of construction the ring members are castellated or otherwise shaped to engage with a plurality of retractable pegs or the like carried by the body part. At least one peg is associated with each ring member so that one or more of the pegs can be adjusted to engage with one or more of the ring members to secure the required ring member or members relative to the body part. The pegs are preferably spring loaded to be normally urged into engagement with their respective ring members and can be held against their spring loading out of such engagement by a mechanical control system when required so that, when the pegs are released by the control system, they trip into engagement solely under spring action and at a predetermined face which is insufficient to damage the ring members or pegs (which could otherwise be the case if the pegs were engaged by normal pressure). This latter form of construction is preferred as it may be found that in certain conditions of operation the above described clamping devices are inclined to stick or 'fire' to the ring members by the effect of the viscous liquid medium.

It will be apparent that, for a given mounting head constructed in accordance with the present invention, the number of variations which are possible in the degrees of feel obtainable increases as the number of ring members increase by virtue of different sizes of ring members which can be incorporated and the several combinations of ring members which can be secured relative to the body part. For example, in addition to the condition where the ring engaging means does not secure any of the ring members relative to the body part, if a mounting head incorporates two ring members the ring-engaging means can be adjusted to provide any one of 3 degrees of feel, whereas if a mounting head incorporates four ring members, the ring-engaging means can be adjusted to provide any one of 15° of feel.

For a given mounting head constructed in accordance with the present invention the characteristic of feel obtained by a relatively moving ring member or members and the rotor is largely dependent upon the clearance between the surfaces of the or each ring member and the adjacent opposed surfaces of the rotor, the viscosity of the liquid medium utilized and possibly, to a lesser extent, friction developed between any contacting surfaces of the or each ring member and the rotor. Consequently the range of the degrees of feel which can be provided by a given mounting head can be changed by changing the liquid medium utilized for one of a different viscosity.

The viscous liquid medium selected for use in the mounting head should preferably be one which provides lubrication, has high shear properties and provides lubrication, has high shear properties and provides resistance to oxidation and heat. Dimethyl silicone fluids have been found particularly suitable and in particular Polydimethyl Siloxane fluid manufactured by Midland Silicones Limited and sold under the MS 200 series. It is to be appreciated that the viscosity of the fluid employed can be changed as required but a liquid medium which has found particularly suitable for use in the head of the present invention is one having a viscosity in the order of 1 million centistokes.

Figure 2:
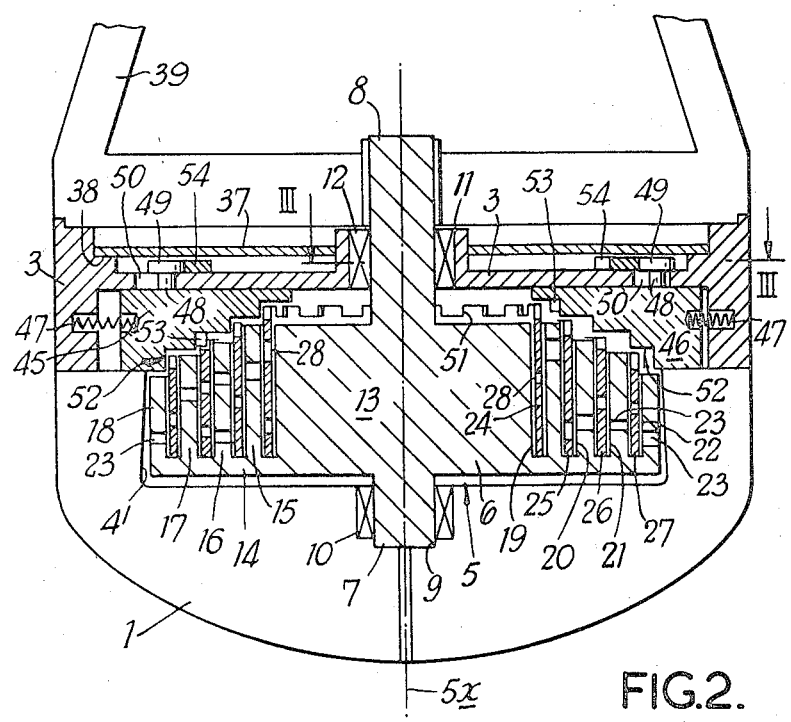
Figure 3:
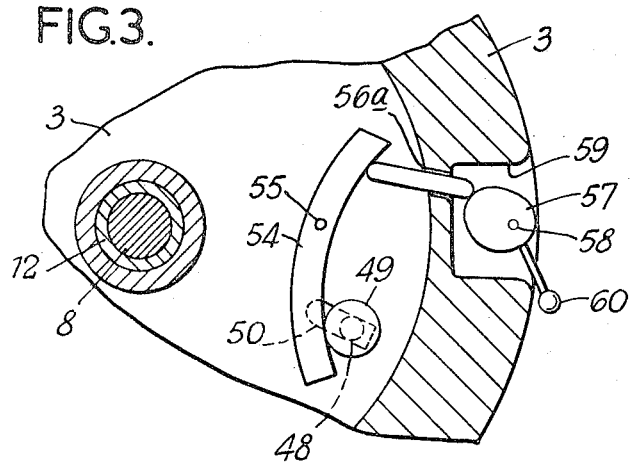

It is frequently desirable to provide a mounting head which permits a camera mounted thereon to be swiveled in two mutually perpendicular planes to provide a scanning and tilting movement and such a mounting head constructed in accordance with the present invention will now be described, by way of example only, with reference to the accompanying illustrative drawings in which:

FIG. 1 is an axial section through the mounting head in which the ring engaging means comprises a plurality of clamping devices;

FIG. 2 illustrates a modification of the mounting head shown in FIG. 1 in which the ring engaging means comprises retractable pegs adapted for engagement with castellations on the ring members, and FIG. 3 is a scrap section taken on the line 111–111 of FIG. 2 and illustrates a mechanical control mechanism by which a retractable peg is engaged and disengaged from its respective ring member. Where possible throughout the following description the same parts or members in each of the FIGS. have been accorded the same references.

Referring firstly to FIG. 1, the mounting head includes a hollow body part 1 fixedly secured by bolts 2 to which is a bearing plate 3 which may be considered as forming part of the body part. The bearing plate 3 and body part 1 together define a housing 4 within which is housed a rotor assembly shown generally at 5.

The rotor assembly 5 includes a rotor 6 which is provided with a pair of cylindrical and coaxial bosses 7 and 8. The boss 7 extends into an aperture 9 provided in the body part 1 and is mounted therein in a bearing 10 and the boss 8 extends through an aperture 11 provided in the bearing plate 3 and is mounted therein in a bearing 12. The rotor 6 can exhibit axial rotation in the bearings 10 and 12 about axis 5x relative to the body part 1 and bearing plate 3. The bearings 10 and 12 are conveniently ball races.

The rotor 6 has a center part 13 of cylindrical form which is coaxial with the axis 5x and radially extending from the center part 13 is a base part 14. Upstanding in an axial direction from the base part 14 are four radially spaced, endless walls 15 to 18. The walls 15 to 18 are of cylindrical form, located axially one within the other and are coaxial with the center part 13 of the rotor. The opposed surfaces between the adjacent walls 15 to 18 and between the wall 15 and the center part 13 are parallel and define four radially spaced, cylindrical chambers 19 to 22 which are coaxial with the axis 5x. Each of the walls 15 to 18 is provided with holes 23 which pass radially therethrough and are circumferentially spaced. The rotor 13 can be made as an integral unit or fabricated.

The rotor assembly 5 further includes a plurality of annular ring members which, in this example, comprises four cylindrical members 24 to 27 which are respectively located in the cylindrical chambers 19 to 22. The cylindrical inner and outer surfaces of each of the members 24 to 27 are parallel and the members 24 to 27 are located axially one within the other and coaxial with the axis 5x. Cylindrical members 24 to 27 are preferably a push and sliding fit in their respective cylindrical chambers and each member when located in its chamber axially extends beyond adjacent walls of the rotor 6. Holes 28 are provided in each of the cylindrical members 24 to 27 which holes pass radially therethrough and are circumferentially spaced.

As shown, the outer cylindrical surface of the wall 18 is substantially parallel with the axis 5x and part 4' of the housing 4 defined by the inner surface of the body part 1 is of frustoconical form coaxial with the axis 5x. The frustoconical surface 4' of the body part 1 axially overlies and diverges from the outer cylindrical surface of the wall 18 in a direction from the free end of the wall 18 towards the base part 14.

The bearing plate 3 carries four adjustable clamping devices of which two are shown generally at 29 and 30. The clamping devices are associated one with each of the cylindrical members 24 to 27 and, in FIG. 1, the devices 29 and 30 are respectively associated with the ring members 24 and 27. Each of the clamping devices comprises a pair of opposed jaws 31 and 32 which are located adjacent the inner and outer sides of the cylindrical member associated therewith and straddle the end thereof which extends from the rotor 6. Each pair of jaws 31 and 32 is located in an aperture 33 which extends axially through the bearing plate 3 and are mounted in the aperture to exhibit sliding movement relative to the bearing plate 3 in a radial direction. Each of the jaws is provided with a screw-threaded hole and each pair of jaws 31, 32 are in screw-threaded engagement with a threaded part 35' of a rod 35 which extends radially through the bearing plate 3 to an adjustment knob 36. The screw-threaded holes in each pair of jaws for a clamping device are threaded in opposite senses so that rotation of the rod 35 by the knob 36 in one sense of direction causes the jaws to move towards each other and thereby clamp the cylindrical member associated therewith to the bearing plate 3 (and thereby to the body part 1) and rotation of the rod 35 in the opposite sense of direction opens the jaws thereby releasing the cylindrical member from the bearing plate 3. In the present example the four clamping devices are coplanar and the rods extend radially of the boss 8 so that the adjustment knobs are equally spaced around the periphery of the bearing plate 3 but it will be appreciated that the location and relative disposition of the clamping devices can be arranged as convenient. The jaws of the clamping devices are conveniently retained in the bearing plate 3 by a cover plate 37 which is screwed or otherwise secured to an annular rebate 38 provided on the bearing plate.

Slidably mounted on the bearing plate 3 is a frame 39 which is to carry the camera. The frame 39 is fixedly secured by keying or otherwise to the boss 8 for rotation therewith.

When the housing 4 and chambers 19 to 22 are fully or partly filled with a viscous liquid medium and the body part 1 is mounted on a suitable support (for example, by use of lugs 1' provided on the body part) and the frame 39 carries a camera, it will be apparent that the camera can be rotated about the axis 5x in one plane relative to the support by rotation of the frame 39 and thereby the rotor 6 (and any of the cylindrical members 24 and 27 which are not held by the clamping devices). If none of the clamping devices are adjusted to secure their associated cylindrical members 24 to 27 to the bearing plate 3, the frame 39 and rotor assembly 5 can rotate comparatively freely and the minimum degree of feel is obtained to rotational movement of the camera. If now the clamping device 29 is adjusted for its jaws, 31, 32 to clamp the cylindrical member 24 to the bearing plate 3, during panning movement of the camera and thereby axial rotation of the frame 39, rotor 6 and cylindrical members 25 to 27, the opposed surfaces of the wall 15 and center part 13 move over the cylindrical member 24. Consequently shear forces are developed on the viscous liquid medium in the cylindrical chamber 19 by the relatively moving surfaces. The shear forces so developed impart a "drag" on the rotor 6 and consequently panning movement of the camera is not as free as in the aforementioned case where all the cylindrical members were free to rotate with the rotor, a relative increase in feel is thereby provided to movement of the camera. The degree of feel provided for panning movement of the camera can be selectively increased or decreased by changing the size of the cylindrical member which is clamped to the bearing plate 3 as required. Further, any combination of the cylindrical members can be selected and secured by their associated clamping devices to the bearing plate, thereby providing (in addition to the rotor assembly 5 rotating freely) 15° of feel, maximum feel being obtained when all four cylindrical members 24 to 27 are clamped to the bearing plate 3.

As an example of practical use of the mounting head above described, consider that the camera is panning to follow a vehicle moving at high speed, in this case none of the cylindrical ring members 24 to 27 would be clamped to the bearing plate 3 and the camera can be manually panned both quickly and smoothly. Conversely, assume that the camera is to pan to follow a very slowly moving object, in this case all the cylindrical ring members would be clamped to the bearing plate 3 thereby necessitating in considerable manual force being applied to pan the camera whilst the reaction applied by the viscous liquid medium ensures that the initial and subsequent panning movement of the camera is smooth.

As mentioned above, the frame 39 is intended to carry a camera for panning movement in a first plane about the axis 5x. We will now consider a construction by which the camera is pivotally mounted on the frame 39 to exhibit movement in a second plane which is perpendicular to the first plane. Such a pivotal mounting provided on the frame 39 is shown diagrammatically at 40. From the following description it will be apparent that the construction and method of operation of the mounting 40 is basically the same as the pivotal mounting provided between the frame 39 and the body part 1 with the exception that the relatively stationary and moving parts of the two mountings are effectively interchanged. For convenience of description, members and parts which are incorporated in the mounting 40 and which are similar in construction and operation to the members and parts which are incorporated in the mounting between the frame 39 and the body part 1 are shown by the same reference numbers but to avoid confusion the letter $a$ is appended to such references of the mounting 40.

The mounting device 40 includes a rotor assembly 5$a$ which comprises a rotor 6$a$ having an axis 5$a$ and four cylindrical ring members 24$a$ to 27$a$ which are located one in each of the array of radially spaced cylindrical recesses 19$a$ to 22$a$ provided in the rotor 6$a$ and coaxial with the axis 5$xa$. The boss 7$a$ extends axially from the center part 13$a$ of the rotor 5$a$ passes through the frame 39 and is fixedly secured thereto (by keying or otherwise) both against movement in its longitudinal direction and against axial rotation. The rotor assembly 5$a$ is housed in the chamber 4$a$ defined between the hollow body part 1$a$ and the bearing plate 3$a$ which is fixedly secured thereto. The bearing plate 3$a$ is mounted on the boss 8$a$ of the rotor 6$a$ through a bearing 12$a$ and the body part 1$a$ is mounted on the boss 7$a$ through a bearing 10$a$ so that the bearing plate 3$a$ and the body part 1$a$ can exhibit unified rotation on the bearings 10$a$ and 12$a$ relative to the rotor 6$a$ about the axis 5$xa$. The bearing plate 3$a$ carries the four clamping devices which are associated one with each of the cylindrical members 24$a$ to 27$a$. Two clamping devices are shown at 29$a$ and 30$a$ which are respectively associated with the cylindrical ring members 24$a$ and 27$a$. The clamping devices 29$a$ and 30$a$ are adjusted through rods by knobs 36$a$.

Fixedly secured by bolts or otherwise to the body part 1$a$ is a mounting plate 41 which is additionally supported by a strut 42. The strut 42 is rotationally mounted on the boss 7$a$ through a bearing 43. The mounting plate 41 is adapted to carry the camera and is conveniently provided with a lug 44 to which is connected a control handle.

It will be apparent that the mounting plate 41 can exhibit pivotal movement through the body part 1$a$ and the strut 42 about the bosses 7$a$ and 8$a$ and if the axis 5$xa$ is perpendicular to the axis 5$x$, a camera mounted on the plate 41 can, for example, scan in either a horizontal or vertical plane, or in any coordinated direction between these planes. It will further be apparent that when the housing 4$a$ and chambers 19$a$ to 22$a$ are fully or partly filled with a viscous liquid medium, the degree of feel to movement of the mounting plate 41 during rotation about the axis 5$xa$ can, in addition to a comparatively free running condition, be selected from any one of 15° of feel by selective adjustment of the clamping devices.

A considerable advantage of the mounting head is that, by selective adjustment of the clamping devices associated with both the pivotal mounting 40 and the pivotal mounting between the frame 39 and the body part 1, a condition can be achieved whereby the degree of feel during panning in one plane is the same as the degree of feel for panning in a mutually perpendicular plane, thereby enabling an operator to move the camera smoothly along a desired nonlinear path.

During operation of the mounting head it is possible that the viscous liquid medium in the cylindrical chambers (19 to 22 and 19$a$ to 22$a$) is displaced therefrom by relative movement between the cylindrical members and the rotors. The viscous liquid medium should be present in the cylindrical chambers at all times during operation of the mounting head and, in the construction above described and illustrated, it is believed that viscous liquid displaced from the cylindrical chambers is returned thereto by a pumping effect which is developed during relative movement between the outer cylindrical wall of each rotor and the inner frustoconical surface 4' and 4$a$' of the associated body part. Such a pumping effect has been successfully achieved by the outer cylindrical wall of the rotor and the frustoconical surface of the body part converging in an axial direction at an angle of substantially 4°.

Referring now to FIGS. 2 and 3, the mounting head partly illustrated has a modified, and preferred, arrangement for the ring clamping means by which the cylindrical ring members 24 to 27 can be selectively secured relative to the body part 1. The ring-clamping means includes four slide blocks (of which two are shown at 45 and 46) which are retained and slidably mounted one in each of four symmetrically disposed slideways machined in the bearing plate 3. The slide blocks are mounted to exhibit sliding movement relative to the bearing plate 3 in a radial direction and are each spring loaded at 47 relative to the bearing plate to be biased radially inwards towards the axis 5x. Each slide block is slidably secured in its slideway to the bearing plate by a rivet or screw 48 having a head 49 which extends through a radially extending slot 50 in the bearing plate 3. Each slot 50 determines the radial sliding movement permitted by its respective slide block.

As shown in FIG. 2, the cylindrical ring members 24 to 27 are of different axial lengths to extend from the rotor 6 in echelon and the ends of the cylindrical members which extend beyond the rotor are castellated as shown at 51. Conveniently, for ease of manufacture, the four slide blocks are identical in shape and each has a stepped profile 52 which is substantially complementary to the echelon array of the castellated ends 51. Each slide block has fixed thereto a peg 53 which is conveniently machined integral therewith. Pegs 53 are located on the stepped profiles 52 and are associated one with each of the cylindrical members 24 to 27 so that, when the slide blocks are moved under the spring biasing to their radially innermost positions, each peg is located in a castellation of its respectively associated cylindrical member to secure that cylindrical member relative to the body part 1. Conveniently each peg 53 is tapered in a radial sense to move smoothly into a castellation. In FIG. 2 the slide block 46 is shown at its radially outermost position and its peg 53 is located in radial alignment with the castellations of cylindrical ring member 24 to engage with said castellations when it is moved to its radially innermost position; the slide block 45 is shown at its radially innermost position with its peg 53 in engagement with the castellations of the cylindrical member 26; and the remaining two slide blocks have their respective pegs located to engage with the castellations of cylindrical members 22 and 25 respectively.

It will be seen that by selectively moving the pegs 53 into and out of engagement with the castellations of their respectively associated cylindrical members the degree of feel applied to relative rotation between the rotor 6 and body part 1 can be selectively adjusted in a similar manner to that above described with reference to FIG. 1.

The pegs 53 are normally urged by the springs 47 into engagement with their respective castellations so that the force applied to effect such engagement is constant and is insufficient to damage either the pegs or the cylindrical members (which may not be the case if the pegs were manually engaged). Consequently to achieve control of engagement and disengagement of the pegs 52 it is only necessary to provide means for selectively moving each of the slide blocks radially outwards against their spring biasing and such means is conveniently in the form of a lever system which will now be described with reference, more particularly to FIG. 3. For convenience, only the lever system for controlling the slide block 46 will be described, it being appreciated that four such lever systems are incorporated, one for each slide block.

The lever system includes a rocker arm 54 which is pivotally mounted at 55 on the bearing plate 3 to abut the rivet head 49 so that pivotal movement of the rocker arm causes the rivet 48 to be moved along its slot and thereby the slide block 46 to be moved radially along its slideway. Movement of the rocker arm 54 is effected through a rod 56 housed for longitudinal sliding movement in a hole 56a provided in a sidewall of the bearing plate 3. One end of the rod 56 abuts the rocker arm 54 on the side of the pivot 55 remote from the head 49 and the other end abuts a cam plate 57 which is pivotally mounted at 58 in an external recess 59 provided in the side of the bearing plate 3. The cam plate 57 is controlled by a lever 60 and is so profiled that, in the position shown, the rocker arm 54 is pivoted through the rod 56 to a position in which the slide block 46 is held against its spring bias at its radially outermost position and its peg 53 is disengaged from cylindrical ring member 24 (as shown in FIG. 2). If the cam plate 57 is now rotated about its pivot 58 by throwing the lever 60 to the opposite end of recess 59, the rod 56 moves over the cam profile into the recess 59 and the rocker arm 54 is pivoted by abutment of the head 49 thereon due to the spring biasing of the slide block 46 to permit the slide block to move radially inwards and its peg 53 to engage in a castellation of the cylindrical ring member 24. Consequently by rotating the cam plate 57, the cylindrical ring member 24 (and similarly the cylindrical members 25 to 27) can be selectively released from, or secured relative to, the body part 1.

It will be apparent to persons skilled in the art that the ring engaging means above described with reference to FIGS. 2 and 3 can be incorporated in the mounting device 40 as referred to in FIG. 1.

Although the body part 1 can be coupled directly to a support or stand, as for example through the lugs 1' (see FIG. 1), it may be provided with a part spherical base (as shown in FIG. 2) which is intended for mounting in a complementary bowl fitting of a stand or support, an example of such a fitting is known under the Trade Name "ARRIFLEX" bowl fitting.

In a practical construction of the above described and illustrated mounting heads, the body parts, bearing plates, frame, slide blocks (when provided) and mounting plate are made in aluminum the rotors are made in lead bronze, the cylindrical members are made in mild steel and the clamps (when provided) are made in hardened tool steel. A clearance of 0.004 inches was provided between the cylindrical surfaces of each cylindrical member and the opposed cylindrical surfaces of the rotor and very satisfactory results were obtained using Polydimethyl Siloxame fluid having a viscosity of 1 million centistokes.

I claim:

1. In a mounting head for a camera or like device, a rotor assembly mounted to be capable of axial rotation relative to a body part adapted to be coupled to a first member, the rotor assembly comprising a rotor adapted to be coupled to a second member which is intended to be axially rotated relative to the first member and having at least two chambers containing a viscous liquid medium and ring members located one in each of the chambers to be coaxial with the axis of rotation and capable of axial rotation therein relative to the rotor through the viscous liquid medium; and ring-engaging means associated with the ring members whereby the ring members can be selectively engaged and held stationary relative to the body part so that the degree of feel during relative rotation between the rotor and body part can be selectively adjusted by adjustment of the ring engaging means to vary the ring members which are held stationary relative to the body part.

2. In a mounting head according to claim 1 in which the coaxial ring members are located axially, at least part, one within the other.

3. In a mounting head according to claim 1 in which the chambers are coaxial and located axially, at least part, one within the other.

4. In a mounting head according to claim 1 in which the chambers and ring members are annular.

5. In a mounting head according to claim 4 in which the annular chambers are of cylindrical shape and are formed between adjacent and opposed cylindrical surfaces of an array of axially extending and radially spaced annular flanges of the rotor.

6. In a mounting head according to claim 4 in which the annular ring members are a sliding and push fit in their respective annular chambers.

7. In a mounting head according to claim 1 in which the chambers communicate through apertures in the rotor to permit flow of the viscous liquid medium between chambers.

8. In a mounting head according to claim 1 in which the ring members define apertures through which the viscous liquid medium can flow between the inner and outer peripheral surfaces of the ring members.

9. In a mounting head according to claim 1 in which the rotor assembly is mounted in an enclosed housing of the body part which contains a reservoir of the viscous liquid medium.

10. In a mounting head according to claim 9 in which the chambers and housing communicate through apertures in the rotor to permit flow of the viscous liquid medium between the housing and chambers.

11. In a mounting head according to claim 9 in which the rotor and body part are shaped in the housing to provide a pumping effect on the viscous liquid medium to circulate the viscous liquid medium through the housing and into the chambers during relative rotation between the rotor and body part.

12. In a mounting head according to claim 11 in which an outer and axially extending peripheral sidewall and an adjacent axially overlying inner peripheral sidewall of the body part which partly defines the housing are convergent towards each other in an axial direction and said sidewalls provide the pumping effect during relative rotation therebetween.

13. In a mounting head according to claim 12 in which the inner peripheral sidewall of the body part is frustoconical and the outer peripheral sidewall of the rotor is cylindrical and coaxial with the frustoconical sidewall of the body part.

14. In a mounting head according to claim 1 in which the ring-engaging means is carried by the body part and is adjustable thereon to selectively engage and disengage with the ring members.

15. In a mounting head according to claim 14 in which the ring-engaging means comprises at least two pegs operatively associated one with each ring member and selectively adjustable to engage and disengage with their respective ring members.

16. In a mounting head according to claim 15 in which each peg is biased to normally engage with its respective ring member and a mechanical control system is provided for each peg by which the pegs can be selectively moved and retained against their biasing at positions in which they are disengaged from their respective ring members.

17. In a mounting head according to claim 15 in which each peg is carried by a slide block mounted in a slideway of the body part, each slide block being spring loaded with respect to the body part to bias its peg into engagement with its respective ring member and movement of the slide block against its spring loading to disengage its peg from its respective ring member being controlled by a lever system carried by the body part.

18. In a mounting head according to claim 17 in which the lever system comprises a rocker arm pivotally mounted on the body part to react against the slide block and a cam lever pivotally mounted on the body part to react against the rocker arm so that pivotal movement of the cam lever causes the rocker arm to displace the slide block against its spring loading to disengage the peg from its respective ring member.

19. In a mounting head according to claim 15 in which each ring member is castellated and the pegs are adapted to engage with a castellation in their respective ring members.

20. In a mounting head according to claim 14 in which the ring-engaging means comprises at least two clamping devices operatively associated one with each ring member and selectively adjustable to clamp their respective ring members to the body part.

21. In a mounting head according to claim 20 in which each clamping device comprises a pair of jaws mounted on the body part to straddle its respective ring member and controlled by rotation of a screw-threaded bolt to clamp and release its respective ring member.

22. In a mounting head according to claim 1 in which the viscous liquid medium is a dimethyl silicone fluid.

23. In a mounting head according to claim 1 in which the viscous liquid medium has a viscosity of substantially 1 million centistokes.

24. In a mounting head according to claim 1 in which the rotor or body part is coupled to a frame for rotation therewith and which frame is adapted to carry the camera or like device to permit panning movement of the camera or like device about the axis of the rotor.

25. In an assembly for pivotally carrying a camera or like device and having a mounting head according to claim 24 in which the frame carries a mounting plate for the camera or like device which is pivotally carried on the frame to permit rotational movement about a second axis which is substantially perpendicular to the axis of the rotor and wherein the mounting plate is rotatably mounted with respect to the frame through a second mounting head to permit the mounting plate to be tilted about the axis of the rotor of the second mounting head and the degree of feel during such tilting movement to be selectively adjusted by adjustment of the ring engaging means of the second mounting head to vary the ring members which are held stationary relative to the body part of the second mounting head.

26. In an assembly according to claim 25 in which the rotor of the second mounting head is fixedly secured to the frame and the mounting plate is secured for rotation with the body part of the second mounting head.